(12) United States Patent
Lifson et al.

(10) Patent No.: US 7,481,069 B2
(45) Date of Patent: Jan. 27, 2009

(54) CONTROLLING A VOLTAGE-TO-FREQUENCY RATIO FOR A VARIABLE SPEED DRIVE IN REFRIGERANT SYSTEMS

(75) Inventors: Alexander Lifson, Manlius, NY (US); Michael F. Taras, Fayetteville, NY (US)

(73) Assignee: Carrier Corporation, Farmington, CT (US)

( * ) Notice: Subject to any disclaimer, the term of this patent is extended or adjusted under 35 U.S.C. 154(b) by 505 days.

(21) Appl. No.: 11/191,679

(22) Filed: Jul. 28, 2005

(65) Prior Publication Data

US 2007/0022765 A1 Feb. 1, 2007

(51) Int. Cl.
F25B 1/00 (2006.01)
F25B 49/00 (2006.01)

(52) U.S. Cl. .......... 62/228.4; 62/230
(58) Field of Classification Search .......... 62/180, 62/230, 228.4, 228.1, 498, 227
See application file for complete search history.

(56) References Cited

U.S. PATENT DOCUMENTS

| | | | |
|---|---|---|---|
| 3,410,405 A | 11/1968 | Marsteller | |
| 4,446,704 A * | 5/1984 | Yamazaki et al. | 62/180 |
| 4,663,942 A * | 5/1987 | Kanazawa | 62/227 |
| 4,765,150 A | 8/1988 | Persem | |
| 5,086,626 A | 2/1992 | Iida | |
| 5,245,836 A | 9/1993 | Lorentzen et al. | |
| 5,255,529 A | 10/1993 | Powell et al. | |
| 5,490,394 A | 2/1996 | Marques et al. | |
| 5,568,732 A | 10/1996 | Isshiki et al. | |
| 5,613,369 A | 3/1997 | Sato et al. | |
| 5,657,638 A | 8/1997 | Erdman et al. | |
| 5,694,783 A | 12/1997 | Bartlett | |
| 5,782,101 A | 7/1998 | Dennis | |
| 5,797,276 A | 8/1998 | Howenstine et al. | |
| 5,924,847 A | 7/1999 | Scaringe et al. | |
| 6,073,457 A | 6/2000 | Kampf et al. | |
| 6,138,467 A * | 10/2000 | Lifson et al. | 62/217 |
| 6,397,610 B1 | 6/2002 | Weng et al. | |
| 6,415,617 B1 | 7/2002 | Seem | |
| 6,434,960 B1 | 8/2002 | Rousseau | |
| 6,560,980 B2 | 5/2003 | Gustafson et al. | |
| 6,647,735 B2 | 11/2003 | Street et al. | |
| 6,694,763 B2 | 2/2004 | Howard | |
| 6,968,708 B2 | 11/2005 | Gopalnarayanan et al. | |

OTHER PUBLICATIONS

International Search Report and Written Opinion Dated Sep. 13, 2007.
Preliminary Report on Patentability dated Feb. 7, 2008.

* cited by examiner

Primary Examiner—Chen-Wen Jiang
(74) Attorney, Agent, or Firm—Carlson, Gaskey & Olds

(57) ABSTRACT

A refrigerant system is provided with at least one variable frequency drive. In the past, the variable frequency drives were operable such that the voltage-to-frequency ratio remained constant regardless of operation. The present invention realizes that variations in the voltage-to-frequency ratio may be desirable, and the refrigerant system control drives the motors associated with relevant refrigerant system components to reach an optimum voltage-to-frequency ratios in order to achieve higher efficiency, provide operational safety and prevent nuisance shutdowns.

16 Claims, 1 Drawing Sheet

CONTROLLING A VOLTAGE-TO-FREQUENCY RATIO FOR A VARIABLE SPEED DRIVE IN REFRIGERANT SYSTEMS

BACKGROUND OF THE INVENTION

This application relates to a refrigerant system wherein a motor for at least one component in a refrigerant system is provided with a variable frequency control, and a ratio of the frequency to voltage provided by this control is adjusted to be at an optimum level.

Refrigerant systems are utilized in many air conditioning and heat pump applications for cooling and/or heating the air entering an environment. The cooling or heating load on the environment may vary with ambient conditions, and as the temperature and/or humidity levels demanded by an occupant of the environment change.

In some refrigerant systems, a single compressor is utilized to compress the refrigerant and move the refrigerant through the cycle connecting indoor and outdoor heat exchangers in a closed loop. However, under many circumstances, it would be desirable to have the ability to vary the capacity, or amount of cooling or heating provided by the refrigerant system.

Variable speed drives are known for driving compressors at a variable speed in a refrigerant system. By driving the compressor at a higher or lower speed, the amount of refrigerant that is compressed per unit of time changes, and thus the system capacity can be adjusted. Other refrigerant system components such as fans and pumps may be provided with variable speed drives as well for similar purposes of enhanced performance, improved reliability and operational safety.

In general, known variable frequency controls have been operated such that a ratio of the voltage to the frequency is maintained constant. Thus, as the frequency increases, so does the voltage. On the other hand, modern inverters within these variable speed controls have the ability to adjust both frequency and voltage independently of each other. Thus, the limitation in the prior art of maintaining the constant voltage-to-frequency ratio is not necessary.

The present invention seeks to improve performance of these known systems by optimizing the voltage-to-frequency ratio dependent on system operating and environmental conditions.

SUMMARY OF THE INVENTION

The inventors have determined that a ratio of voltage-to-frequency for the motors of the components in a refrigerant system such as a compressor, fan or pump should vary with operating and environmental conditions. As an example, to improve the compressor efficiency and at the same time maximize its motor strength, it would be desirable to operate the compressor at an optimum voltage. The optimum voltage is dependent upon motor load. For the same frequency, a higher load would suggest a higher voltage, and a lighter load a reduced voltage. Similarly, the frequency of operation will desirably increase with increased loads. Voltage adjustments are impractical in the prior systems that rely upon constant frequency and voltage main line supplies. Furthermore, transformers are unrealistic as they are bulky, expensive and are not suitable for a continuous voltage adjustment.

The above-mentioned variable speed drives may provide voltage adjustment as part of an inverter functionality and operation. Although, as mentioned, the known practice is to adjust the voltage proportionally to a change in the frequency so as voltage-to-frequency ratio remains constant regardless of the motor loading conditions. This was thought to be the easiest way to optimize the motor operation.

However, the prior art has overlooked that there would be an optimum voltage-to-frequency ratio for a compressor, fan or pump motors, and that this optimum ratio would not be a constant value. Instead, this optimum ratio will vary dependent upon system operational and environmental conditions that in turn will affect motor loading characteristics.

When variable frequency drives are employed, the control of the ratio upwardly or downwardly from a constant ratio is often straightforward and can be accomplished on a software level.

The present invention varies the voltage-to-frequency ratio based upon measured or determined system parameters that define loading on the motor of at least one component within a refrigerant system. A desired voltage-to-frequency ratio is then determined based upon this loading, and the voltage and/or frequency are varied to reach this optimal ratio.

As an example, if a compressor is operating near its rating point and delivering a required capacity, then by using a look-up table, or an equation, or a graph that defines motor operating efficiency with respect to torque, frequency and voltage, a most appropriate voltage-to-frequency ratio can be selected for most efficient operation. The look-up table, or an equation, or graph can be initially determined experimentally, and then stored within a control for the refrigerant system.

Alternatively, if a motor is running near its stall point or being overheated due to a high load, it may be desirable to increase the voltage-to-frequency ratio effectively increase motor strength and bring its operation outside of a potential danger zone. Also, if a motor were running unloaded, it would be desirable to reduce the voltage-to-frequency ratio for optimum operation.

Various sensors and methods can be applied for estimating the load, and may include direct or indirect slip measurements or determination of compressor motor electric slip, torque or power. The motor load can also be estimated based on current measurements or pressure measurements at the compressor suction and/or discharge by current and pressure sensors respectively. Saturation temperature measurements using temperature transducers installed at the evaporator and condenser can also be used to estimate the motor load. Additional temperature transducer measurements for determining refrigerant temperature entering or exiting the compressor can be used to further refine the estimate of the motor load.

Adjustments in the voltage-to-frequency ratio over an operating range can be used for a compressor motor, for fan motors and pump motors. Further, this can be combined with different unloading schemes, such as bypass, suction modulation, etc.

These and other features of the present invention can be best understood from the following specification and drawings, the following of which is a brief description.

DETAILED DESCRIPTION OF THE PREFERRED EMBODIMENT

Figure 1:
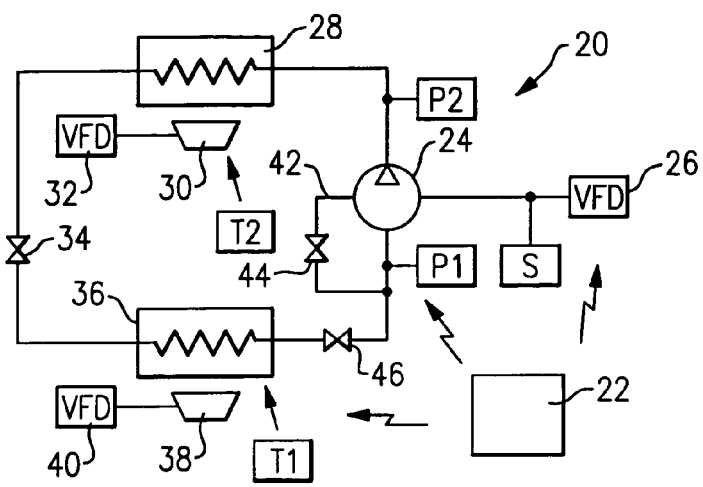
FIG. 1 is a schematic view of a system incorporating the present invention.

A basic refrigerant system 20 is illustrated in FIG. 1. An electronic control 22 controls several features within the refrigerant system 20. In particular, a compressor 24 is powered by a motor having a variable speed drive (or variable frequency drive) 26 in communication with the control 22. The compressor compresses refrigerant and delivers it downstream to a condenser 28. A fan 30 moves air over the condenser 28 and is provided with a variable speed drive 32. Downstream of the condenser 28 is an expansion device 34, and downstream of the expansion device 34 is an evaporator 36. A fan 38 moves air over the evaporator 36 and is controlled by a variable speed drive 40. An optional suction modulation valve 46 modulates the flow of refrigerant entering the compressor 24. An optional unloader line 42 with an optional unloader valve 44 selectively allows partially or completely compressed refrigerant to be returned from the compressor 24 back to a suction line for the compressor 24. The valves 34, 44 and 46 can be in communication with the control 22 as well. For purposes of this invention, it should be understood that the motor controls 26, 32 and 40 are variable frequency drives, which are controlled by the control 22. The details of the control may be as known in the art. The benefits of this invention are directed to the way in which the control 22 drives the variable frequency drives. Further, it is understood by a person ordinarily skilled in the art that liquid pumps could be utilized by the refrigerant system 20 in place of fans 30 and 38 to deliver secondary loop fluid to the heat exchangers 28 and 36.

Figure 2:
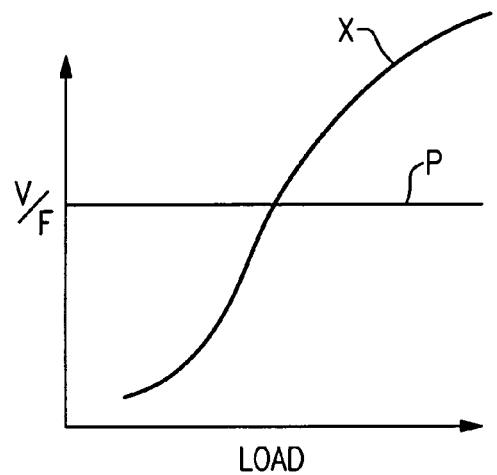
FIG. 2 is a chart showing a feature of the present invention.

As shown in FIG. 2, in the prior art, a ratio of voltage-to-frequency for the variable frequency drives has been held constant with load. This is shown by a line P on the graph. Thus, as load has increased, a refrigerant system operating with a variable frequency drive has also proportionally increased the voltage so as the voltage-to-frequency ratio remained constant.

However, the inventors of this application have recognized that under certain conditions, an optimum ratio of voltage-to-frequency may actually need to be moved along a curve such as curve X, or some sloped line, in the V/F-LOAD plane. Thus, the present invention seeks to identify an optimum ratio of voltage-to-frequency, and change the frequency and voltage accordingly as load changes. Further, as can be appreciated from the curve X, there are an infinite number of voltage to frequency ratios that may be selected based upon a variation in load.

The optimum voltage-to-frequency ratio may be determined experimentally, or analytically. As an example, tests can be taken under various operating, environmental and loading conditions, and optimum ratios can be determined in that manner. Those optimum ratios can then be stored in a look-up table, or programmed into an equation(s), that is accessible to the control 22.

Figure 3:
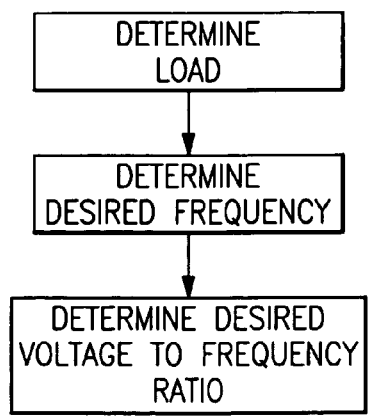
FIG. 3 is a flow chart of the present invention.

As shown in FIG. 3, the present invention operates under a simplified flow chart wherein a load is determined. The load may be determined in several fashions, such as monitoring various system operational characteristics. A load sensor S is shown associated with the compressor 24. Once the load is determined, a desired frequency for motor operation may be identified. Also, a desired voltage may be identified. Alternatively, a desired ratio may be determined. As mentioned before and shown in FIG. 1, the sensor S can provide compressor motor load estimate based on direct or indirect determination of electric slip, torque, current or power measurements. Alternatively, the pressure measurements by sensors P1 and P2 installed at the compressor suction and discharge respectively or the saturation temperature measurements by the sensors T1 and T2 installed at the evaporator and condenser locations respectively can be used to estimate the compressor motor load. Additional temperature transducers for determining refrigerant temperature entering or exiting the compressor can be used to further refine the estimates of the compressor motor load. Similar loading sensors S may be employed for the fan/pump operation monitoring.

As mentioned above, under certain conditions it may be desirable to increase frequency and actually reduce voltage. In the prior art, which maintained a constant voltage-to-frequency ratio, such a control option would not have been provided.

It has to be understood that the compressor 24 represents a compressor system, where individual compressors may be connected in series or in tandem, and only some of these individual compressors may be provided with variable speed drives.

The present invention, by providing the option of changing the voltage-to-frequency ratio, allows a designer of the refrigerant systems to have access to identifying and driving through these optimum ratios to achieve higher efficiency, provide operational safety and prevent nuisance shutdowns.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A refrigerant system comprising:
a compressor delivering a compressed refrigerant downstream to a condenser, refrigerant passing from said condenser to an expansion device, and from said expansion device to an evaporator, refrigerant passing from said evaporator back to said compressor, a fluid-moving device for moving fluid over said condenser, and a fluid-moving device for moving fluid over said evaporator, said fluid-moving devices for said condenser and said evaporator, and said compressor all being provided with an electric motor, and at least one of said electric motors being provided with a variable speed drive; and
a control for said refrigerant system, said control being operable to control said variable speed drive, said variable speed drive being operable to change the frequency of operation of said at least one electric motor, and to independently change the voltage supplied to said at least one electric motor, and said control determining optimum values for said frequency and said voltage, and driving said at least one electric motor to said desired frequency and said desired voltage.

2. The refrigerant system as set forth in claim 1, wherein said fluid-moving devices for moving fluid over said condenser and said evaporator are fans.

3. The refrigerant system as set forth in claim 1, wherein said fluid-moving devices for moving fluid over said condenser and said evaporator are pumps.

4. The refrigerant system as set forth in claim 1, wherein said compressor is provided with an unloader circuit.

5. The refrigerant system as set forth in claim 1, wherein a suction modulation valve is placed between said evaporator and said compressor.

6. The refrigerant system as set forth in claim 1, wherein an optimum ratio of the voltage-to-frequency is determined based upon a motor load, and said control driving said frequency and said voltage to achieve said optimum voltage-to-frequency ratio.

7. The refrigerant system as set forth in claim 6, wherein voltage is increased as said motor load increases towards a predetermined high value.

8. The refrigerant system as set forth in claim 1, wherein said at least one compressor is one of a reciprocating compressor, scroll compressor, screw compressor, and rotary compressor.

9. The refrigerant system as set forth in claim 1, wherein said system includes at least one sensor from a set of pressure transducers, temperature transducers, current sensors, torque sensors, and power sensors.

10. The refrigerant systems as set in claim 9, wherein the said control determining optimum values for said frequency and said voltage based on the measurements from any of said sensors.

11. The refrigerant system as set forth in claim 1, wherein an optimum voltage to frequency ratio extends along a curve.

12. The refrigerant system as set forth in claim 1, wherein an infinite number of optimum voltage to frequency ratios may be selected.

13. A method of operating a refrigerant system comprising the steps of:
   delivering a compressed refrigerant downstream to a condenser, refrigerant passing from said condenser to an expansion device, and from said expansion device to an evaporator, refrigerant passing from said evaporator back to said compressor; fluid over said condenser, and moving fluid over said evaporator, fluid-moving devices for said condenser and said evaporator, and said compressor all being provided with an electric motor, and at least one of said electric motors being provided with a variable speed drive; and
   controlling said variable speed drive, to change the frequency of operation of said at least one electric motor, and to independently change the voltage supplied to said at least one electric motor, and determining optimum values for said frequency and said voltage, and driving said at least one electric motor to said desired frequency and said desired voltage.

14. The method as set forth in claim 13, wherein an optimum ratio of the voltage-to-frequency is determined based upon a load on the refrigerant system, and said control driving said frequency and said voltage to achieve said optimum ratio.

15. The method as set forth in claim 14, wherein voltage is increased as load increases towards a predetermined high value.

16. The method as set in claim 13, wherein the optimum values for frequency and voltage are based on measurements from sensors.

* * * * *